United States Patent
Graute et al.

(10) Patent No.: US 6,601,608 B1
(45) Date of Patent: Aug. 5, 2003

(54) SUCTION DEVICE ATTACHMENT WITH A SUCTION CHANNEL

(75) Inventors: Ludger Graute, Essen (DE); Heinrich Iglseder, Rodenberg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 09/980,228

(22) PCT Filed: May 18, 2000

(86) PCT No.: PCT/EP00/04494
§ 371 (c)(1),
(2), (4) Date: Mar. 19, 2002

(87) PCT Pub. No.: WO00/78199
PCT Pub. Date: Dec. 28, 2000

(30) Foreign Application Priority Data

Jun. 19, 1999 (DE) .......................................... 199 28 224

(51) Int. Cl.⁷ ............................................... F16K 17/28
(52) U.S. Cl. .................... 137/460; 15/246.2; 137/519.3
(58) Field of Search ........................ 15/246.2; 251/142, 251/149; 137/460, 519.5

(56) References Cited

U.S. PATENT DOCUMENTS 2,536,428 A * 1/1951 Dimitri et al. .............. 251/142
4,489,744 A * 12/1984 Merrill ........................ 137/202
5,507,312 A * 4/1996 Dillman .................. 137/533.15

FOREIGN PATENT DOCUMENTS

DE 19654335 6/1998
EP 0872205 10/1998

* cited by examiner

Primary Examiner—Stephen M. Hepperle
(74) Attorney, Agent, or Firm—Martin A. Farber

(57) ABSTRACT

The invention relates to a suction device attachment (1) comprising a suction channel (5), whereby a component (9) whose insertion is to be monitored is disposed in said suction channel. A valve (V) having a movable closing body (6) in the form of a valve ball (7) that is freely retained in a valve chamber (8) is mounted behind the component (9) in the direction of flow (R). The invention aims at ensuring reliable insertion of such a vacuum cleaner attachment that is disposed in such a way as to protect against jamming, destruction or manipulation and that stops the volumetric suction flow when no component or a wrong component is inserted. To this end, an inlet cross section of the valve chamber (8), which is reduced by the insertion of the component (9) to be monitored, provokes a sufficient flow deflection (S) so as to move the valve (V) to the opening position, whereby the cross section of the hole is so large that the valve ball (7) is pressed into its closing position by the pressure of the flow when the component (9) is not inserted.

7 Claims, 1 Drawing Sheet

U.S. Patent  Aug. 5, 2003  US 6,601,608 B1
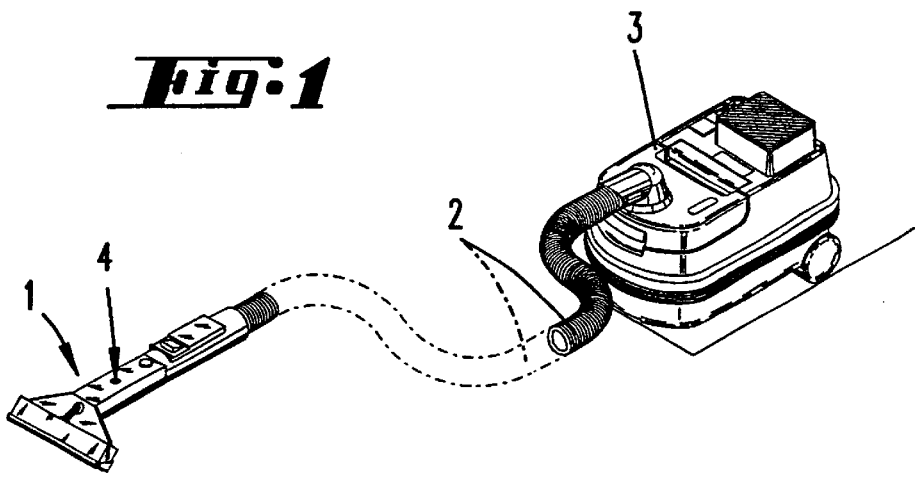
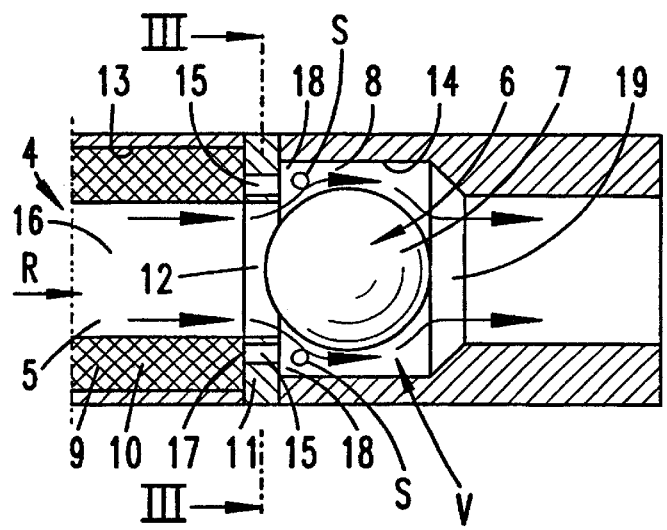
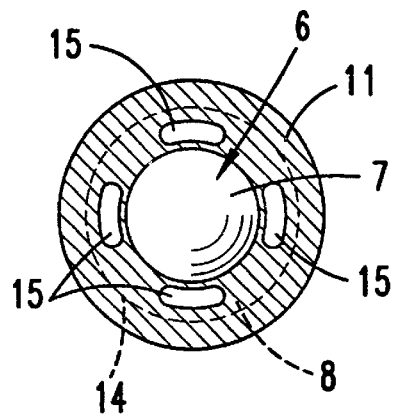
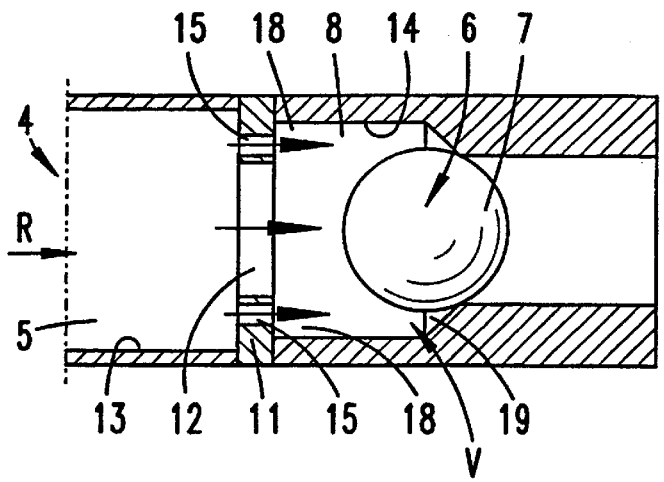
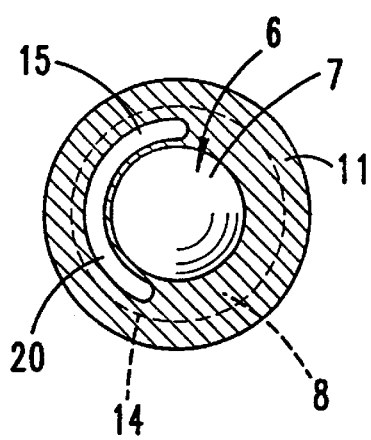

SUCTION DEVICE ATTACHMENT WITH A SUCTION CHANNEL

FIELD AND BACKGROUND OF THE INVENTION

The invention relates to a suction-appliance attachment having a suction channel, there being disposed in the suction channel a component which is to be monitored in terms of insertion and downstream of the component, as seen in the flow direction, a valve which has a movable closure body in the form of a valve ball secured freely in a valve chamber.

Mechanical solutions are known as means for ensuring reliable insertion. For this purpose, use is made, for example, of levers or similarly actuated elements which, when the necessary components are not inserted, block the functioning of the appliance to a greater or lesser extent. On account of the mechanics, such systems are susceptible to being jammed, destroyed or manipulated. Furthermore, in the case of suction-appliance attachments for the wet-cleaning of surfaces, it is known to provide a movable closure body, for example in the form of a ball, which can be triggered when exposed to moisture. Such an arrangement is known, for example, from DE-A1 196 54 335. The contents of this laid-open application are hereby included in full in the disclosure of the present invention, also for the purpose of incorporating features of this patent application in claims of the present invention.

SUMMARY OF THE INVENTION

In respect of the above-described prior art, it is an object of the invention to provide a means for ensuring reliable insertion for a suction-appliance attachment of the type in question which is disposed such that it is protected against being jammed, destroyed and manipulated and which, when a component is not inserted or an incorrect component is inserted, suppresses the suction-volume stream.

This problem is solved first and foremost by the subject matter of claim 1, this being based on the fact that an inlet cross-section of the valve chamber, which is reduced in size by insertion of the component which is to be monitored, effects a flow deflection which is sufficient for the opening position of the valve, it being the case that, when the component is not inserted, the opening cross-section is large enough for the valve ball to be pressed into its closure position by the flow pressure. By virtue of a particular cross-sectional profiling of the suction channel and/or of the valve ball in the region of the valve formed, the flow around the closure body, when the correct component is inserted, is configured such that the axial forces acting keep the closure body in a state of equilibrium. These forces are, for example, the weight forces resulting from the dynamic and static pressure and also the frictional forces as well as, in the case of means according to the invention for ensuring reliable installation being disposed in a suction-appliance attachment for the wet-cleaning of surfaces, the momentum and/or the impact forces. As is known from the patent application mentioned in the introduction, the closure body, in the case of the normal oncoming flow being superimposed by a mass flow of increased density, is displaced, by this additional momentum, into a closure position from its position of equilibrium, which forms the valve-opening position. This effect is utilized according to the invention in order to form the means for ensuring reliable insertion. When a component is not inserted or when an incorrect component is inserted, the flow deflection which is required for the state of equilibrium in the valve in the open position is thus not provided, so that the flow pressure to which the closure body is then subjected presses this closure body more or less abruptly into the closure position. The flow deflection which is required for the opening position of the valve can thus only be set by the correct component being inserted. As a result of this configuration, with the exception of the closure body formed as a valve ball, there is no need for any further movable parts in order to form the means for ensuring reliable insertion. Furthermore, the configuration according to the invention also gives a high level of protection against manipulation, since the closure body, formed as a ball, is in a concealed position, inaccessible from the outside. Providing a valve ball further counteracts jamming of the closure body. As a further advantage of the means according to the invention for ensuring reliable insertion, it should be pointed out that this means operates without using electrical energy, as a result of which there is no need for any energy converters, such as for example motors or electromagnets. It is further found to be advantageous that the means according to the invention for ensuring reliable insertion can be used as often as desired. The configuration according to the invention ensures interruption of the suction-volume stream when the component is not inserted or an incorrect component is inserted. As a result, the user of the suction-appliance attachment provided with this means for ensuring reliable insertion is obliged to insert the correct component in order to operate the appliance. In the case of being used in a suction-appliance attachment for the wet-cleaning of surfaces, a component which is to be monitored in terms of insertion may be a sponge body for taking up the absorbed cleaning liquid, the insertion of which sponge body is imperative for maintaining reliability. In a test to operate the appliance without a system-compatible storage/sponge body, the closure body, formed as a valve ball, is pressed abruptly into the closure position, in order to interrupt the volume stream, by the increased flow pressure. It is thus not possible, in this example, for any liquid to be taken in without control. If, in contrast, the correct sponge body is properly inserted, then, by virtue of the flow deflection provided here in the region of the inlet cross-section, the closure body remains in its position of equilibrium, which defines the opening position of the valve and which the closure body only leaves when a mass-flow threshold value is exceeded, for example once the maximum liquid absorption of the sponge body has been exceeded. This configuration according to the invention provides positionally independent detection of necessary components in minimal installation space, while simultaneously providing a fluidic switching signal with a large switching-force range. An advantageous further development of the subject matter of the invention provides that the inlet cross-section is formed as a perforated base. The openings provided in the perforated base are dimensioned and positioned such that, when a correct component is inserted, a flow deflection which causes the valve to open is provided in the region of the inlet cross-section. If, in contrast, no component or an incorrect component is inserted, then the air flowing through the further openings in the perforated base effects disruption of the equilibrium-providing flow deflection. Furthermore, it is provided that the perforated base has a central clearance through which the valve ball does not pass. This clearance preferably forms the inlet cross-section of the valve chamber, it being further preferred for the channel cross-section of the valve chamber to be greater than the clearance cross-section. As a result of the fact that, in a further preferred manner, the valve ball has a diameter which is larger than the clearance, an in particular sharp-edged deflection of the volume stream which enters into the valve chamber from the clearance, and flows around the valve ball, effects a supporting vortex in the region of the closure body, so that the latter remains in the position of equilibrium, which defines the opening position of the valve. If, in contrast, when the component is not inserted or an incorrect component is inserted, further openings of the perforated base are released, then the air flowing in through the further openings disrupts the supporting vortex, so that the valve ball, entrained by the flow, is pressed into the closure position. Furthermore, it is proposed that the component which is to be monitored has a flow clearance adapted to the central clearance. As a result of this configuration, there is no disruption to the flow behaviour in the proper state, i.e. when the correct component is inserted, in the region of the central clearance. It may further be provided that the perforated base has symmetrically distributed openings which are disposed, for example, in a uniformly distributed manner around the central clearance of the perforated base. When the correct component is inserted, these openings are closed by this component, so that the element for ensuring reliable insertion operates satisfactorily. If, in contrast, no component is inserted or an incorrect component is inserted, then the monitoring cross-sections, which are kept open at least partially as a result, cause the closure body to be displaced into the valve-closure position. The openings here may be of any desired shape, the overall size of the opening cross-sections being in the range from 10–50% of the inflow cross-section, i.e. of the cross-section of the clearance. As an alternative to the previously described alignment of the openings, it may also be provided that the perforated base has non-symmetrically distributed openings. Finally, the configuration here may be selected such that an opening is formed as a circle-segment-like slot which extends in a region of the perforated base between the central clearance and the valve-chamber wall. Adaptation of the closure-body weight makes it possible to set the reaction threshold and the reaction time. It is thus possible to use, for example, an HDPE plastics ball having a weight from 1 to 10 grams.

BRIEF DESCRIPTION OF THE DRAWINGS

The invention is also explained hereinbelow with reference to the attached drawing, although the latter only illustrates two exemplary embodiments. In the drawing:

| FIG. 1 | shows a suction-appliance attachment which is connected to a vacuum cleaner via a suction tube and is intended for the wet-cleaning of surfaces; |
|---|---|
| FIG. 2 | shows, in a schematic illustration, a longitudinal section through a first embodiment of a valve, the valve being in the opening position with the component which is to be monitored inserted; |
| FIG. 3 | shows the section along line III—III in FIG. 2; |
| FIG. 4 | shows a sectional illustration corresponding to FIG. 2 but with the valve in the closure position with the component which is to be monitored not inserted; |
| FIG. 5 | shows a cross-sectional illustration according to FIG. 3, but relating to a second embodiment. |

DETAILED DESCRIPTION OF THE PREFERRED EMBODIMENT

A suction-appliance attachment 1, in this case for the wet-cleaning of surfaces, will be illustrated and described first of all with reference to FIG. 1. This suction-appliance attachment 1 is in flow connection with a floor-supported vacuum cleaner 3 via a suction tube 2. In the case of a configuration of the suction-appliance attachment 1 for the wet-cleaning of surfaces, as is known a cleaning liquid is applied to the surface which is to be cleaned and, at the same time, is extracted by suction together with the particles of dirt which have been taken up. For this purpose, the suction-appliance attachment 1 has a dirty-water tank 4 (not illustrated any more specifically in FIG. 1) in the region of a suction channel 5 formed in the attachment. The absorbed liquid is deposited in this tank 4.

Disposed downstream, as seen in the flow direction R, of this tank 4 is a valve V which can be triggered when exposed to moisture during operation and, when a predetermined residual moisture content in the air stream is exceeded, closes the suction channel in order to interrupt the air stream.

FIGS. 2 to 4 illustrate a first embodiment of a valve V, which has substantially a valve ball 7 forming a closure body 6. This ball is disposed, such that it can be moved in the axial direction of the suction channel 5, in a region which is cross-sectionally larger than the suction channel 5. This region of enlarged cross-section forms a valve chamber 8.

According to the patent application mentioned in the introduction, to which you are referred again at this stage as well, it is possible for the valve chamber 8 to be provided with inwardly projecting ribs, which are disposed on its inner wall and are aligned in the axial direction of this chamber, in order to form a cage. It is also possible to provide, in the region of the valve-inlet opening, a stop pin which can be adjusted in the axial direction and is intended for defining the valve-opening position.

According to the invention, the valve V serves, at the same time, as an element for ensuring reliable insertion, in order to monitor the insertion of a component 9 which, in the exemplary embodiment illustrated, is a sponge body 10 for absorbing liquid. This sponge body is a constituent part of the dirty-water tank 4.

In particular in the case of the suction-appliance attachment 1 being configured for the wet-cleaning of surfaces, it is imperative, in order to operate the appliance, to insert a liquid-absorbing sponge body 10. If the latter is absent, this may, as is known, result in damage, in particular in the region of the floor-supported vacuum cleaner 3. Furthermore, for reasons of user safety, no liquid must pass into the electrical regions of the vacuum cleaner.

In order to form the means for ensuring reliable insertion, the inlet cross-section of the valve chamber 8 is formed as a perforated base 11 which has a central clearance 12 through which the valve ball 7 does not pass. The diameter of the clearance 12 here corresponds approximately to the diameter of the suction channel 5 in the operating position.

The clearance 12, furthermore, is disposed in axial extension of the suction channel 5, the valve chamber 8 having a larger diameter than the central clearance 12.

Furthermore, the chamber 13, which accommodates the sponge body 10, also has a larger diameter than the central clearance 12.

In the annular region remaining between the clearance 12 and the valve-chamber wall 14, the perforated base 11 is provided with additional openings 15, four openings of equal size being disposed in a uniformly distributed manner in the exemplary embodiment illustrated (see sectional illustration in FIG. 3).

The component 9 which is to be monitored—in this case the sponge body 10—has a flow clearance 16, adapted to the central clearance 12, in order to form the suction channel 5.

In FIG. 2, a component 9 which is to be monitored—in this case a sponge body 10—has been inserted into the chamber 13 in the correct position. The annular end surface 17, which is oriented in the direction of the valve V, closes the additional openings 15, which are formed in the perforated base 11. As a result, upon operation of the appliance, the volume stream only enters into the valve chamber 8 by way of the clearance 12, flowing around the closure body 6 (valve ball 7) disposed in the chamber. The rotationally symmetrical closure body 6 here is kept in a state of equilibrium, if appropriate, by the particular profiling of the valve-chamber cross-section, this being brought about by the sharp-edged inlet region to the valve chamber 8 and the supporting vortex S formed in the corner zones 18 as a result.

This state of equilibrium is independent of the flow speeds in the two regions, this presupposing that the proper component 9, which closes the additional openings 15 of the perforated base 11, has been inserted.

It is also possible, furthermore, in contrast to the exemplary embodiment shown, for the component 9 to be some other appliance part which is imperative for the operation of the appliance, for example a filter element.

The fluidic means which is formed for ensuring reliable insertion does not disrupt the blocking function of the valve V upon insertion in a suction-appliance attachment for wet-cleaning purposes. It is also the case here, as in the patent application mentioned in the introduction, that, in the case of the normal oncoming flow being superimposed by a mass flow of increased density, the valve ball 7 is moved, from the position of equilibrium according to FIG. 2, into a valve-closure position, in which the valve ball 7 closes the valve-chamber outlet 19 with sealing action, which results in the suction-air stream being interrupted.

If, in contrast, according to the illustration in FIG. 4, no component 9—in this case sponge body 10—is inserted, then air flows into the corner regions 18 of the valve chamber 8 by way of the now exposed openings 15 of the perforated base 11, as a result of which the supporting vortex S is destroyed and the state of equilibrium is changed such that, upon operation of the appliance, i.e. when the suction-air stream is switched on, the valve ball 7 is displaced into the closure position, in which the suction-air stream is interrupted. Accordingly, the desired suction process cannot be carried out without a properly inserted component 9.

Furthermore, it is also possible for the means according to the invention for ensuring reliable insertion to act when the component 9 is not fully inserted and/or the component 9 is inserted but is not compatible. The reliability of this system is thus always ensured.

The sectional illustration according to FIG. 5 illustrates an alternative configuration of the additional opening 15. The latter is in the form of a circle-segment-like slot 20 in this case, it also being the case here, as in the previously described exemplary embodiment, that the opening cross-section corresponds approximately to 0.1 to 0.5 times the clearance cross-section.

We claim:

1. Suction-appliance attachment (1) having a suction channel (5), there being disposed in the suction channel (5) a component (9) which is to be monitored in terms of insertion and downstream of the component (9), as seen in flow direction (R), a valve (V) which has a movable closure body (6) in form of a valve ball (7) secured freely in a valve chamber (8), an inlet cross-section of the valve chamber (8), which is reduced in size by insertion of the component (9) which is to be monitored, effects a flow deflection (S) which is sufficient for opening position of the valve (V), wherein, when the component (9) is not inserted, opening cross-section is large enough for the valve ball (7) to be pressed into its closure position by flow pressure.

2. Suction-appliance attachment according to claim 1, wherein the inlet cross-section is formed as a perforated base (11).

3. Suction-appliance attachment according to claim 2, wherein the perforated base (11) has a central clearance (12) through which the valve ball (7) does not pass.

4. Suction-appliance attachment according to claim 3, wherein the component (9) which is to be monitored has a flow clearance (16) adapted to the central clearance (12).

5. Suction-appliance attachment according to claim 2, wherein the perforated base (11) has symmetrically distributed openings (15).

6. Suction-appliance attachment according to claim 2, wherein the perforated base (11) has non-symmetrically distributed openings (15).

7. Suction-appliance attachment according to claim 1, wherein an opening (15) is formed as a circle-segment-like slot (20).

* * * * *